ized Patent [19]

Pacifici et al.

[11] 4,134,809
[45] Jan. 16, 1979

[54] RADIATION CURABLE CELLULOSE ESTER-ACRYLATE COMPOSITIONS

[75] Inventors: James G. Pacifici; Gordon C. Newland, both of Kingsport, Tenn.

[73] Assignee: Eastman Kodak Company, Rochester, N.Y.

[21] Appl. No.: 826,615

[22] Filed: Aug. 22, 1977

[51] Int. Cl.² ........................... C08L 1/00; C08L 3/00
[52] U.S. Cl. ........................ 204/159.12; 204/159.15; 260/17 A; 427/54; 428/417; 428/418; 428/439; 428/464
[58] Field of Search .................. 204/159.12, 159.15; 260/17 A

[56] References Cited

U.S. PATENT DOCUMENTS

| | | | |
|---|---|---|---|
| 3,697,619 | 10/1972 | Nagata et al. | 260/836 |
| 3,883,453 | 5/1975 | Takahashi et al. | 260/15 |
| 3,912,670 | 10/1975 | Huemmer et al. | 260/23 EP |
| 3,953,386 | 4/1976 | Murphy et al. | 260/17 A |
| 4,066,582 | 1/1978 | Babian et al. | 260/17 A |

Primary Examiner—Richard B. Turer
Attorney, Agent, or Firm—Elliott Stern; Daniel B. Reece, III

[57] ABSTRACT

This invention describes novel radiation curable cellulose ester compositions comprising a carboxylated cellulose ester, a glycidyl acrylate or methacrylate, and an effective amount of a photoinitiator. These compositions, when cured, give hard, tough coatings with excellent adhesion to certain metals.

10 Claims, No Drawings

RADIATION CURABLE CELLULOSE ESTER-ACRYLATE COMPOSITIONS

This invention relates to radiation curable cellulose ester compositions comprising a carboxylated cellulose ester, a glycidyl acrylate or glycidyl methacrylate, and a photoinitiator. In another aspect of this invention, certain modifications in the method of preparation of these compositions result in fluidic systems characterized by their low volatility.

It is known cellulose esters containing an $\alpha,\beta$-unsaturated moiety are useful as resins and modifying resins in formulating ultraviolet light (UV) curable compositions. We have invented novel cellulose ester coating compositions in which the primary components are a carboxy-substituted cellulose ester and a glycidyl acrylate or methacrylate. These compositions, when cured with light, preferably UV-light, in the presence of a photoinitiator, give clear coatings with good hardness, good adhesion to metals such as aluminum, good solvent resistance, and good flexibility.

Additionally, in situations where volatility problems are encountered during operation, the process of this invention provides a method by which these problems can be minimized if not overcome by the addition of certain specific nonreactive acid diluents.

Accordingly, there is provided a radiation curable cellulose composition comprising a mixture of components A, B and C as follows:

A. from 10 to 75 weight percent of a carboxylated cellulose ester;
B. from 90 to about 25 weight percent of glycidyl acrylate or glycidyl methacrylate or combination thereof, said weight percent being based on the total weight of components A and B; and
C. an effective amount of a light sensitive photoinitiator.

In a more preferred embodiment of this invention, there is provided a radiation curable cellulose composition comprising a mixture of components A, B and C as follows:

A. from 20 to 50 weight percent of a carboxylated cellulose ester;
B. from 80 to about 50 weight percent of glycidyl acrylate or glycidyl methacrylate or combination thereof, said weight percent being based on the total weight of components A and B; and
C. an effective amount of a photoinitiator selected from benzoin ethers, halomethyl ketones, acetals, or aromatic ketones in combination with amines.

The carboxylated cellulose esters useful in the practice of this invention are well known in the art and may be prepared in a manner known in the art. See, for example, *Industrial and Engineering Chemistry*, Vol. 49, pp. 84–88, January, 1957. Other carboxylated cellulose esters such as cellulose acetate succinate and cellulose acetate tetrahydrophthalate can be prepared by reacting suitably substituted anhydrides such as succinic anhydride, tetrahydrophthalic anhydride, with a suitable amount of, for example, a commercial cellulose acetate. Examples of other carboxylated cellulose esters are cellulose propionate phthalate, cellulose butyrate phthalate, cellulose butyrate 3-nitrophthalate, cellulose butyrate phthaloyl dicarboxylic acid, cellulose butyrate succinate, and the like. The acid number of these carboxy cellulose esters can vary, but preferably the acid number should be within the range of 25 to about 150.

The acid number can be ascertained in a manner well known in the art and further disclosed in *Analytical Chemistry*, Vol. 25, p. 245, February, 1953.

The carboxylated cellulose ester compositions of this invention can further be characterized by the following general formula:

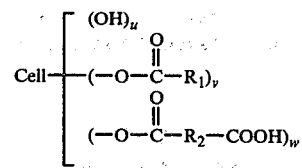

wherein
Cell are the anhydroglucose repeat units;
$R_1$ is lower alkyl having 1 to about 6 carbon atoms such as methyl, ethyl, butyl, etc.;
$R_2$ is ethylene, propylene,

o-phenylene or o-phenylene substituted with methyl, carboxy, nitro or cyano;
u, v and w represent the degree of substitution of the anhydroglucose unit and the sum $u+v+w = 3$. w can be from 0.01 to 2.0; however, the preferred range is 0.1 to 1.0. Since the concentration of carboxyl group will affect both the rate of reaction with the glycidyl group and will regulate the extent of crosslinking, the desired degree of substitution of z will depend upon the properties required for its intended use. The concentration of carboxy cellulose ester in the glycidyl monomers can be from 5 to 60% by weight.

Up to 50% by weight based on the weight of the total composition of other $\alpha,\beta$-ethylenically unsaturated compounds can also be used in combination with the above compositions to prepare the coatings of this invention depending upon the desired physical properties of the end product. Preferably from 0.1 to 30% by weight could be used.

These $\alpha,\beta$-ethylenically unsaturated compounds can be, for example, lower alkyl and substituted alkyl esters of acrylic and methacrylic acid. Examples of such esters include: methyl methacrylate, ethyl methacrylate, 2-ethylhexyl methacrylate, isobutyl methacrylate, butyl acrylate, 2-ethylhexyl acrylate, 2-hydroxyethyl acrylate, 2-methoxyethyl acrylate, 2-hydroxypropyl acrylate, and the like. Polyacrylyl compounds represented by the general formula:

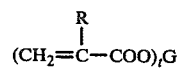

R is hydrogen or methyl; G is a polyvalent alkylene group of the formula

in which x is 2 to 10 and y is 0 to 2 [e.g., (a) divalent alkylene such as 30 $C_xH_{2x}$ when y 0, i.e., $-C_2H_4-$, —$C_3H_6$—, —$C_5H_{10}$—, neo—$C_5H_{10}$, and the like; (b) trivalent alkylene such as $C_xH_{2x-1}$ when y = 1, i.e.,

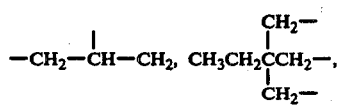

and the like; or (c) tetravalent alkylene such as $C_xH_{2x-2}$ when y = 2;

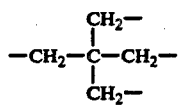

and the like]; a divalent —($C_tH_{2t}O$)$_t C_rH_{2r}$— group in which t is 1 to 10 [e.g., oxyethylene, oxypropylene, oxybutylene, polyoxyethylene, polyoxypropylene, polyoxybutylene, polyoxyethylene-oxypropylene, —$CH_2C(CH_3)_2COOCH_2C(CH_3)_2CH_2$—, etc.]; and r is the valence of G and can be from 2 to 4. Allyl acrylates and methacrylates; e.g., allyl methacrylate, allyl acrylate, diallyl phthalate are also utilizable. Other useful compounds also include vinyl acetate, vinyl and vinylidine halides, e.g., vinyl chloride, vinylidine chloride; amides, e.g., acrylamide, diacetone acrylamide; vinyl aromatics, e.g., styrene alkyl sytrenes, halostyrenes, and divinyl benzenes.

The above unsaturated compounds can be used alone or as mixtures of such compounds or mixtures in combination with other unsaturated components and the like.

The glycidyl acrylate or glycidyl methacrylate useful in the compositions of this invention are characterized by the following structural formulas:

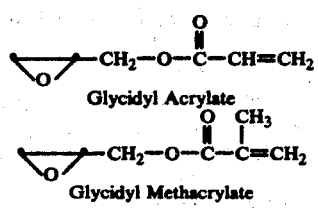

In the presence of a suitable photoinitiator, the composition can be cured to give the desired coating composition.

In another aspect of this invention, a composition or precomposition may be prepared by reacting the glycidyl acrylate or glycidyl methacrylate with the carboxylated cellulose ester, followed by reacting with a carboxylic acid. The product under these conditions would have the formula:

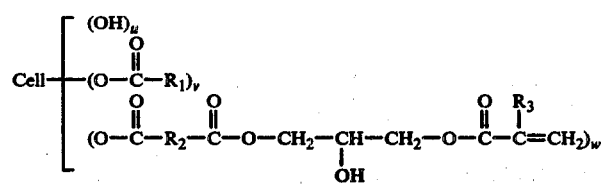

and

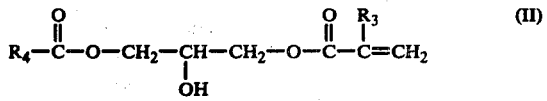  (II)

where
Cell are the anhydroglucose units;
$R_1$ is lower alkyl such as methyl, ethyl, propyl, butyl, etc.;
$R_2$ is ethylene, propylene,

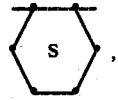

o-phenylene or o-phenylene substituted with methyl, carboxy, nitro or cyano;
$R_3$ is H or methyl;
$R_4$ is alkyl having 1 to about 10 carbon atoms, chloromethyl, chloroethyl, cyclopentyl, cyclohexyl, phenyl or phenyl substituted with alkyl having 1 to about 4 carbon atoms. $R^4$ is, of course, determined by the particular carboxylic acid utilized in the final esterification step. Examples of these acids are acetic acid, propionic acid, butyric acid, isobutyric acid, hexanoic acid, decanoic acid, etc., chloroacetic acid, beta-chloropropionic acid, cyclohexane carboxylic acid, cyclopentane carboxylic acid, benzoic acid, o-, m- or p-toluic acid, para-tert-butyl benzoic acid, and the like;
u, v, and w represent the degree of substitution of the anhydroglucose unit and the sum u+v+w = 3. The degree of substitution of z can be 0.05 to 2.0; however, a range of 0.1 to 1.0 is preferred.

The weight percent ratio (I/II) ranges from 0.01 to 1.0; however, the preferred range is 0.1 to 0.5.

These compositions are prepared by dissolving the desired cellulose esters, which are substituted with a carboxy group, in glycidyl acrylate or methacrylate and heating the mixture to esterify the cellulose carboxylate. To this mixture is added up to an equivalent quantity (based on glycidyl groups) of a carboxylic acid. The mixture is then heated until the added carboxylic acid has been esterified. In some cases, to produce the desired properties, it may be desirable to use less than equivalent quantities of the acid. These systems would therefore contain, in addition to I and II, some unreacted glycidyl acrylate or methacrylate. A particular advantage of these compositions and the method of preparation is that highly sensitive radiation curable compositions can be prepared by combining "saturated components" with unsaturated components in one processing operation. Hence, the properties of the composition can be readily altered by the incorporation of saturated components while retaining a "100% curable" composition. However, this does not restrict the invention to use of a saturated component; other unsaturated components may also be used.

Additionally, the previously mentioned unsaturated compounds can also be used to modify the compositions of this invention.

The photoinitiators useful in the practice of this invention are well known in the art. Patents disclosing a number of these photoinitiators are U.S. Pat. Nos. 3,728,377; 3,912,606; 3,962,055; 3,962,056; 3,988,228; 4,012,302; 3,686,084, all incorporated herein by reference. Of these, the following are preferred: benzophenone, 1-chloronaphthalene, 2-chloronaphthalene, 2-chlorothioxanthone, α,α-diethoxyacetophenone, 2,3-dichloronaphthoquinone, 4,4'-bis(α-chloroacetyl)benzene, α,α,α-trichloroacetophenone, benzoin isopropyl ethyl, 4'-tert-butyl-α,α,α-trichloroacetophenone, 4,4'-bis(chloromethyl)benzophenone, 4-chloromethyl-4'-carbomethoxybenzophenone, 2-chloromethylbenzimidazole, 2-(p-α-chlorotolyl)benzoxazole, 4,4'-dimethylbenzophenone, 3,4-bis(chloromethyl)benzophenone, benzophenone/methyl diethanolamine, α,α-dimethoxy-α-phenylacetophenone, and benzoin isobutyl ether. Any of these photoinitiators can be utilized in the practice of this invention. While some of these are better than others, the particular one used in the system is not critical. These photoinitiators may be added at any time in the production of the conventional light-sensitive materials in amounts conventionally used for photoinitiators. They are generally used in amounts of from 0.01 to about 10%, preferably in amounts of from 0.5 to 3% by weight, based on the weight of the light-sensitive composition.

The glycidyl acrylate and glycidyl methacrylate are known in the art and can be obtained either commercially or prepared in a known manner. Patents disclosing the use of systems employing a glycidyl group are U.S. Pat. Nos. 3,674,545 and 3,654,251.

Conventional thermal inhibitors which are used in the production of light-sensitive compositions, for example, hydroquinone, p-methoxyphenol, t-butylhydroquinone may also be used in the conventional manner in the light-sensitive composition of this invention to alter the curing rates and/or to provide longer storage stability.

The ultraviolet sensitized photopolymerizable composition of the present invention may also contain other additives, pigments, colorants, stabilizers, and the like. For example, polymeric compositions, such as unsaturated polyesters, may also contain, and generally do contain, other additives such as white or colored pigments, or colorants, antioxidants, plasticizers, flow aids, processing aids, polymeric modifiers, and the like.

The following examples are provided to give a better understanding of the invention.

EXAMPLE A - Preparation of Carboxy Cellulose Ester

The following is representative of one method by which the carboxy cellulose esters useful in the practice of this invention may be prepared.

Materials Used
(a) Cellulose acetate butyrate (CAB), 8.5 wt. % hydroxyl is prepared in a manner well known in the art. Cellulose acetate butyrate may be obtained commercially.
(b) Succinic anhydride, glutaric anhydride, and phthalic anhydride are commercially obtainable materials.

Carboxy Cellulose Ester Preparation

To one part of cellulose acetate butyrate ester dissolved in 3 parts glacial acetic acid were added the desired amount of selected dicarboxylic anhydride and 0.75 part sodium acetate catalyst. The mixture was heated, with constant stirring, to 95°–100° C. and a clear solution resulted. After 2.5 hours total reaction time, the solution was cooled, diluted with an equal volume of 80% aqueous acetic acid, and poured into vigorously stirred water to precipitate the cellulose acetate butyrate carboxylate ester. The ester was washed thoroughly in demineralized water and subsequently treated (3 × 30 min.) with water at 90–95° C. to remove traces of uncombined dicarboxylic acid. The washed, filtered ester was dried at 55–60° C. in a forced air oven after which the amount of combined carboxyl was determined by acid number (mg. KOH/g. polymer) titrations in acetone solvent.

(a) When succinic anhydride was the dicarboxylic anhydride utilized, the cellulose acetate butyrate succinate polymer was found to have an acid number of 141.
(b) When glutaric anhydride was the dicarboxylic anhydride utilized the cellulose acetate butyrate glutarate polymer was found to have an acid number of 115.
(c) When phthalic anhydride was the dicarboxylic anhydride utilized, the cellulose acetate butyrate phthalate polymer was found to have an acid number of 107.

EXAMPLE 1

The following carboxy cellulose esters were prepared by treatment of the hydroxy derivative of the appropriate cellulose ester with the corresponding anhydrides as described in Example A. These cellulose esters have an inherent viscosity of approximately 0.25 to 0.30.

Table I

| Sample No. | Ester Group | Carboxylate Group | Acid No. |
|---|---|---|---|
| 1 | propionate | phthalate | 150 |
| 2 | propionate | phthalate | 75 |
| 3 | butyrate | phthalate | 39 |
| 4 | butyrate | phthalate | 53 |
| 5 | butyrate | phthalate | 79 |
| 6 | butyrate | 3-nitrophthalate | 52 |
| 7 | butyrate | phthaloyl dicarboxylic acid | 95 |
| 8 | butyrate | succinate | 88 |

EXAMPLE 2

Compositions containing 20 parts cellulose ester (from Example 1), 75 parts glycidyl methacrylate, and 5 parts bis(chloromethyl)benzophenone were prepared. These samples (two-mil thick) were cast on glass slides and exposed to a Gates 420 U11B lamp (70 watts/inch of arc) for one minute. Pencil hardness values were then determined and the results given in Table II.

Table II

| Sample No. (from Example 1) | Pencil Hardness (ASTM D3363-74) |
|---|---|
| 1 | 3H |
| 2 | 3H |
| 3 | 3H |
| 4 | 3H |
| 5 | 3H |
| 6 | 3H |
| 7 | 3H |

Table II-continued

| Sample No. (from Example 1) | Pencil Hardness (ASTM D3363-74) |
|---|---|
| 8 | 4H |

EXAMPLE 3

The following composition was prepared:
15 parts cellulose propionate phthalate (Acid No. 150)
40 parts glycidyl methacrylate
40 parts hydroxypropyl acrylate
5 parts bis(chloromethyl)benzophenone The composition (one mil) was coated on aluminum and cured with a 70 watt/inch of arc lamp for one minute. The cured film had a pencil hardness of 3H, had excellent adhesion to aluminum, and was resistant to acetone.

EXAMPLE 4

Cellulose butyrate phthalate (I.V. = 0.25; acid number = 79) in the amount of 10.0 grams was added to 35 grams of glycidyl methacrylate and the mixture heated for one hour at 90° C. To 4.5 gram samples of this composition were added 1.5 grams quantities of propionic acid, butyric acid and octanoic acid. These samples were then heated at 80° to 100° C. for 30 minutes and cooled to room temperature. To these samples was added 0.3 gram (5% w/w) of 4,4'-bis(chloromethyl) benzophenone. The resultant compositions had good color (water clear; colorless). Films (2.0 mil) were drawn on glass slides and exposed to a Gates 420 U11B lamp (70 watts per inch of arc) at a distance of 8 centimeters for 1.0 minute. All films were tack free, had surface hardness of HB and 2H and were insoluble in acetone.

EXAMPLE 5

Cellulose butyrate succinate (I.V. = 0.25; acid number = 88) in the amount of 10 grams was added to 35 grams of glycidyl methacrylate and the mixture heated for one hour at 90° C. To a 4.5 gram sample of this solution was added 1.5 gram of phenoxyacetic acid and the mixture heated for one hour at 90° C. The sample was cooled to room temperature and 0.3 gram (5% w/w) of 4,4'-bis(chloromethyl)benzophenone was added. Films of this composition were cast on glass slides and irradiated for one minute with a Gates 420 U11B lamp at a distance of 8 centimeters. The cured samples had a tack free surface and a pencil hardness of 2H.

EXAMPLE 6

A composition containing 20 parts cellulose propionate phthalate (acid number 150) and 75 parts glycidyl methacrylate was heated at 80° C. for 30 minutes. To portions of this composition were added the following photoinitiators (the concentration was 5% w/w) and 3.0 mil film cast on glass slides. These coated slides were irradiated with a Gates 420 U11B lamp (70 watts per inch of arc) for 60 seconds. All systems gave a clear, hard (2H) coating.

Photoinitiators

Benzoin isobutyl ether
Benzoin isopropyl ether
Diethoxyacetophenone
Benzophenone/methyl diethanolamine (2/3)
4,4'-Bis(chloromethyl)benzophenone
2-(p-α-chlorotolyl)benzoxazole
3,4-Bis(chloromethyl)benzophenone
α,α-Dimethoxy-α-phenylacetophenone.

The invention has been described in detail with particular reference to certain preferred embodiments thereof, but it will be understood that variations and modifications can be effected within the spirit and scope of the invention.

We claim:

1. A radiation curable cellulose composition comprising a mixture of components A, B and C as follows:
   A. from 10 to 75 weight percent of a carboxylated cellulose ester;
   B. from 90 to about 25 weight percent of glycidyl acrylate or glycidyl methacrylate or combination thereof, said weight percent being based on the total weight of components A and B; and
   C. an effective amount of a photoinitiator.

2. A radiation curable cellulose composition comprising a mixture of components A, B and C as follows:
   A. from 20 to 50 weight percent of a carboxylated cellulose ester;
   B. from 80 to about 50 weight percent of glycidyl acrylate or glycidyl methacrylate or combination thereof, said weight percent being based on the total weight of components A and B; and
   C. an effective amount of an ultraviolet light sensitive photoinitiator.

3. The composition of claim 1 wherein the carboxylated cellulose ester is selected from cellulose propionate phthalate, cellulose butyrate phthalate, cellulose acetate butyrate phthalate, cellulose butyrate 3-nitrophthalate, cellulose butyrate succinate, cellulose butyrate glutarate, and cellulose butyrate phthaloyl dicarboxylic acid.

4. The composition of claim 2 wherein the carboxylated cellulose ester is selected from cellulose propionate phthalate, cellulose butyrate phthalate, cellulose acetate butyrate phthalate, cellulose butyrate 3-nitrophthalate, cellulose butyrate succinate, cellulose butyrate glutarate, and cellulose butyrate phthaloyl dicarboxylic acid.

5. The composition of claim 1 wherein the photoinitiator is an ultraviolet light sensitive photoinitiator.

6. The composition of claim 2 wherein the photoinitiator is an ultraviolet light sensitive photoinitiator.

7. The composition of claim 5 wherein the photoinitiator is selected from benzophenone, 1-chloronaphthalene, 2-chloronaphthalene, 2-chlorothioxanthone, α,α-diethoxyacetophenone, 2,3-dichloronaphthoquinone, 4,4'-bis(α-chloroacetyl)benzene, α,α,α-trichloroacetophenone, benzoin isopropyl ether, 4'-tert-butyl-α,α,α-trichloroacetophenone, 4,4'-bis(chloromethyl)benzophenone, 4-chloromethyl-4'-carbomethoxybenzophenone, 2-chloromethylbenzimidazole, 2-(p-α-chlorotolyl)benzoxazole, 4,4'-dimethylbenzophenone, 3,4-bis(chloromethyl)benzophenone, benzophenone/methyl diethanolamine (2:3), α,α-dimethoxy-α-phenylacetophenone, and benzoin isobutyl ether.

8. The composition of claim 6 wherein the photoinitiator is selected from benzophenone, 1-chloronaphthalene, 2-chloronaphthalene, 2-chlorothioxanthone, α,α-diethoxyacetophenone, 2,3-dichloronaphthoquinone, 4,4'-bis(α-chloroacetyl)benzene, α,α,α-trichloroacetophenone, benzoin isopropyl ether, 4'-tert-butyl-α,α,α-trichloroacetophenone, 4,4'-bis(chloromethyl)benzophenone, 4-chloromethyl-4'-carbomethoxybenzophenone, 2-chloromethylbenzimidazole, 2-(p-α-chlorotolyl)benzoxazole, 4,4'-dimethylbenzophenone, 3,4-bis(chloromethyl)benzophenone, benzophenone/methyl diethanolamine (2:3), α,α-dimethoxy-α-phenylacetophenone, and benzoin isobutyl ether.

9. The composition of claim 1 admixed with up to 50% by weight, based on the total weight of the final composition, of an ethylenically unsaturated compound.

10. The composition of claim 2 admixed with up to 50% by weight, based on the total weight of the final composition, of an ethylenically unsaturated compound.